United States Patent [19]

Spadafora et al.

[11] Patent Number: 4,799,178

[45] Date of Patent: Jan. 17, 1989

[54] METHOD AND APPARATUS FOR DETECTING ROTATIONAL SPEED

[75] Inventors: Peter J. Spadafora, Kokomo; Jill G. Hersberger, Galveston; Myron H. Bell, Indianapolis; Robert L. Harding, Kokomo, all of Ind.

[73] Assignee: Delco Electronics Corporation, Kokomo, Ind.

[21] Appl. No.: 54,292

[22] Filed: May 26, 1987

[51] Int. Cl.⁴ .............................................. G01P 3/36
[52] U.S. Cl. .............................. 364/565; 364/426.01; 324/166; 377/24
[58] Field of Search ............ 364/565, 566, 426, 484, 364/486; 324/160–162, 166; 361/238, 240; 303/91, 93, 95, 96, 105–109; 73/462, 518; 377/15, 16, 19

[56] References Cited

U.S. PATENT DOCUMENTS

| | | | |
|---|---|---|---|
| 4,485,452 | 11/1984 | Cording et al. | 364/565 |
| 4,506,339 | 3/1985 | Kühnlein | 364/565 |
| 4,569,027 | 2/1986 | Nakano et al. | 364/565 |
| 4,581,713 | 4/1986 | Fennel | 364/565 |
| 4,674,049 | 6/1987 | Kubo | 364/426 |

Primary Examiner—Parshotam S. Lall
Assistant Examiner—David C. Goldman
Attorney, Agent, or Firm—Howard N. Conkey

[57] ABSTRACT

A system and method for determining the rotational speed of a rotating member is described that determines speed from signals having a frequency directly proportional to the rotational speed. The speed signals are counted during each of successive sampling intervals. At the end of each sampling interval, the rotational speed is determined based on a calculation interval that is the time interval from the next-to-last speed signal generated in the prior sampling interval to the last speed signal generated and the number of speed signals occurring in the calculation interval. The resulting overlapping calculation intervals minimize the influence of one speed signal on successive determinations of rotational speed.

6 Claims, 4 Drawing Sheets

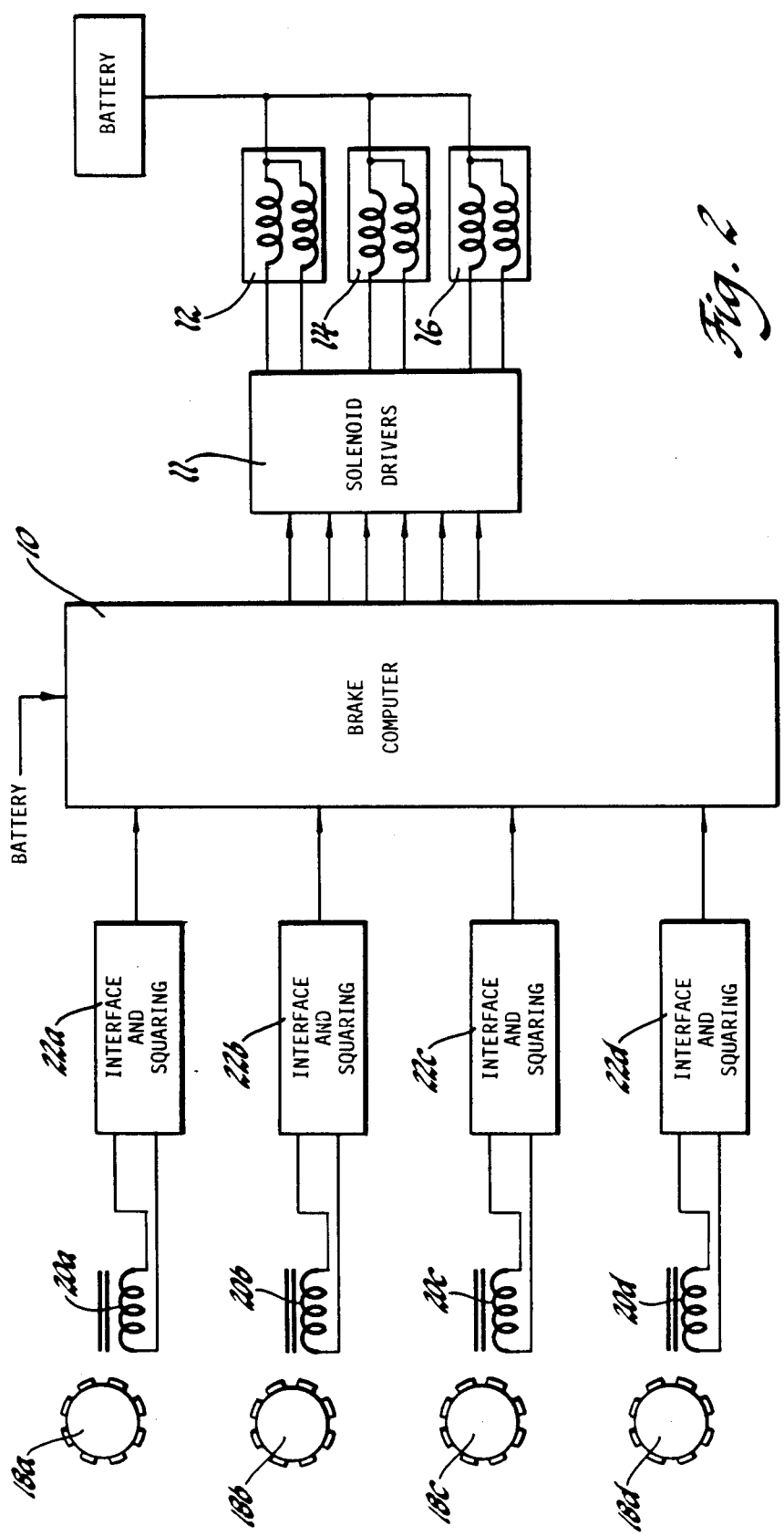

METHOD AND APPARATUS FOR DETECTING ROTATIONAL SPEED

This invention relates to a method and apparatus for detecting the speed of a rotating member such as the speed of the wheel of a vehicle.

Typically in order to provide for the sensing of the rotational speed of a rotating member such as the wheel of a vehicle, a speed sensor is provided that generates a signal having a frequency directly proportional to the rotational speed. The speed sensor usually takes the form of a speed ring rotated by the rotating member having teeth spaced around its periphery which are sensed by an electromagnetic sensor. The electromagnetic sensor provides a pulse each time the speed ring rotates one/n of one revolution where n is the number of teeth on the speed ring. Each pulse may directly comprise a speed signal or alternatively may be shaped into a squarewave speed signal. The frequency that the speed signals are generated is directly proportional to the speed of the rotating member.

A number of methods for determining the frequency of the speed signal and therefore the speed of the rotating member has been proposed. One such method counts the number of speed signals that occur during a constant period of time. However, at low rotational speeds, the number of speed signals counted are small resulting in a low degree of resolution in the measurement of speed. In order to increase the resolution of the speed measurement at low speeds, the period of time over which the speed signals are counted must be extended or the number of teeth spaced around the periphery of the speed ring must be increased. Both of these solutions may be undesirable due to the increase in the time required to obtain a measurement of speed and because there are practical limitations in the number of teeth that can be provided on the speed ring.

Another method proposed to determine the frequency of the speed signals and therefore the rotational speed of the rotating member counts high frequency clock pulses over the interval between two consecutive speed signals. In the case where the speed signal is in the form of a squarewave signal, the clock pulses may be counted over a period defined by the leading or trailing edges of two consecutive squarewave speed signals. The number of high frequency clock pulses counted is representative of the speed of rotation of the rotating member. However, at high rotational speeds, the number of clock pulses becomes small between two consecutive speed signals resulting in poor resolution in the measurement of rotational speed.

To avoid the inaccuracies associated with the above speed measurement methods, it has been proposed to determine the frequency of the speed signals and therefore the rotational speed of a rotating member based on the precise time required for a number of speed signals to be generated over each of successive sampling intervals. In this method of speed measurement, since the beginning and end of each sampling interval does not generally coincide with the generation of a speed signal, precise speed measurement is provided by measuring the elapsed time between beginning and ending speed signals as defined by the sampling interval. The precise time over which the determination of rotational speed is determined is generally provided by counting the pulse output of a high frequency clock beginning at the speed signal just prior to the sampling interval to the last speed signal detected during the sampling interval. This measured time in conjunction with the total number of speed signals generated over the sampling interval is used to calculate the speed of the rotating member. In this system of speed measurement, the accuracy of the determination of the angular speed of the rotating member is limited by the accuracy in the placement of the teeth located on the speed ring from which the speed signals are generated.

In the foregoing speed measurement system where the end of one sampling interval constitutes the beginning of the next sampling interval, the speed signal that defines the end point of the measured elapsed time in one sampling interval defines the beginning point for the measurement of the elapsed time in the subsequent sampling interval. This creates the potential for erroneous speed measurement in two consecutive sampling intervals due to an error in the angular location of a single tooth on the speed ring. In other words, a misplaced speed signal may influence two successive speed measurements.

In certain systems, a high degree of accuracy in the measurement of speed of a rotating member is required. For example, in automotive vehicle anti-lock braking systems, errors in the measurement of wheel speeds will affect the performance of the system. In accord with this invention, the inaccuracy in the speed measurement of a rotating member, such as the wheel of a vehicle, that is associated with the misplacement of a speed signal is minimized by minimizing the influence of a given speed signal on consecutive speed measurements. This is accomplished by preventing a speed signal defining the end point of one timed period associated with one speed sampling interval from constituting the beginning point of the timed period associated with the subsequent speed sampling interval. This is accomplished in accord with this invention without decreasing the total measured time period to a time less than the speed sampling interval so that accuracy of the rotational speed measurement is maximized.

The invention may be best understood by reference to a following description of a preferred embodiment and the drawings in which:

FIG. 2 is a general diagram of a digital computer in a vehicle anti-lock braking system responsive to the speed of the wheels of the vehicle for preventing wheel lockup during braking;

Figures 1, 3:
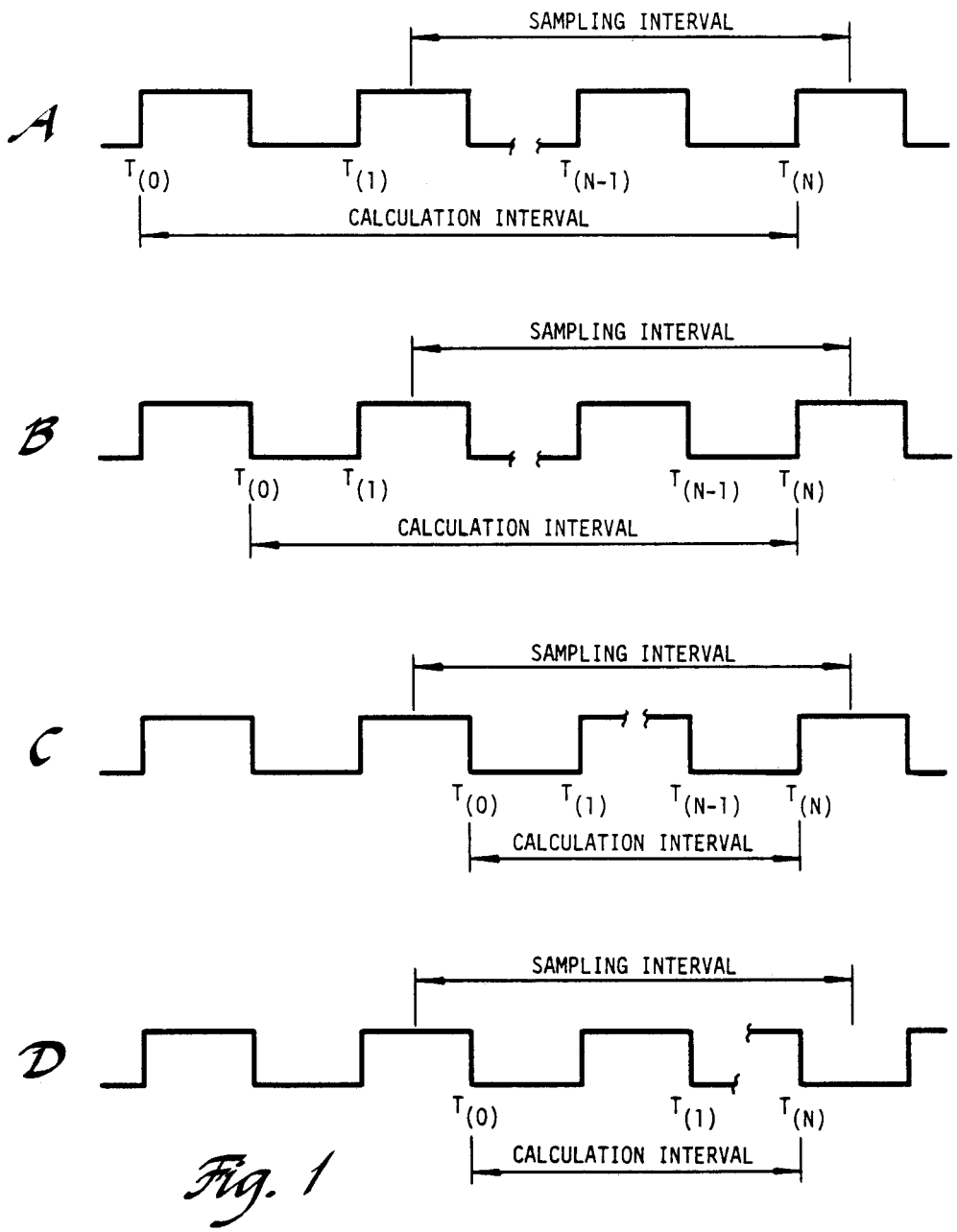
FIG. 1 is a series of speed signal timing diagrams illustrating the principles of this invention.
FIG. 3 is a schematic diagram illustrating buffer registers in the brake computer of FIG. 2 which are associated with the storing of time measurements in the determination of wheel speed.

The principles of this invention are first described with reference to FIG. 1. In the embodiment of the invention to be described, the speed of rotation of a vehicle wheel is repeatedly calculated at predetermined intervals (such as 10 milliseconds) hereinafter referred to as sampling intervals, one such sampling interval being illustrated in each of the timing diagrams A thru D of FIG. 1. Each timing diagram illustrates the repeated wheel speed signals in the form of squarewave signals that are generated as the vehicle wheel rotates. The frequency of the squarewave signals is directly proportional to the wheel speed. Each period between consecutive leading or trailing edges of the squarewave signal is associated with the time between two consecutive teeth on a speed ring of a wheel speed sensor as the wheel rotates.

Wheel speed is determined from the wheel speed signal based on the expression $$\omega = K/T_{av} \qquad (1)$$

where $\omega$ is the wheel speed, K is a constant that is a function of the radius of the wheel and the number of teeth on the speed ring of the speed sensor and $T_{av}$ is the average time between teeth as the wheel rotates.

The average time between teeth is determined in accord with this invention by using techniques that use at least one sampling interval worth of the most recent data. One of three methods are used in determining the average time $T_{av}$: (1) single edge detection where only one edge (leading or trailing) of each squarewave speed signal is used, (2) double edge detection where both leading and trailing edges of each squarewave speed signal are used or (3) low speed estimation.

Single edge detection is associated with higher wheel speeds and is used whenever the last determined wheel speed is greater than a predetermined value. As indicated, only leading or trailing edges of each squarewave speed signal provided by the wheel speed sensor is utilized in determining wheel speed. This single edge speed detection method is demonstrated in FIG. 1A. As illustrated in this Figure, the leading edges of the squarewave signals are utilized in determining the average time between teeth to be utilized in calculating wheel speed.

The average time $T_{av}$ between teeth of the speed sensor to be used in equation (1) to determine wheel speed at the end of a sampling interval with the single edge detection method illustrated in FIG. 1A is defined by the expression $$T_{av} = (T_{(N)} - T_{(0)})/N \qquad (2)$$

where $T_{(0)}$ is the time of occurrence of the next-to-last leading edge of the squarewave signal in the prior sampling interval, $T_{(N)}$ is the time of occurrence of the last leading edge of the squarewave signals generated during the sampling interval and N is one greater than the number of leading edges of the squarewave signals generated during the sampling interval. The time interval between times $T_{(0)}$ and $T_{(N)}$ comprises a wheel speed calculation interval over which N teeth of the speed ring were sensed.

From the foregoing, it can be seen that consecutive speed calculation intervals associated with two consecutive sampling intervals overlap so that they do not end and begin on the same edge of a squarewave speed signal since the last leading edge of the squarewave speed signal that occurs during the prior sampling interval defines the end of the prior speed calculation interval and the next-to-last leading edge of the squarewave speed signal that occurs during the prior sampling interval defines the beginning of the speed calculation interval associated with the next sampling interval. This has the effect of minimizing the influence of a single edge of the squarewave speed signals on the measurement of wheel speed. Further, all of the speed information available during a sampling interval is utilized in the calculation of the average time between the passing of teeth on the speed ring.

In the foregoing manner, if an error is associated with the time of occurrence of the leading edge of one of the squarewave signals such as at time $T_{(N)}$ due to an error in the angular position of a tooth on the speed ring, the error is not introduced into two consecutive calculations of wheel speed. As a result, the overall accuracy of the speed measurement system is improved by minimizing the influence of each speed signal in the repeated calculations of wheel speed.

Double edge detection is associated with lower wheel speeds and is used whenever the last determined wheel speed is less than the predetermined value. The use of double edge detection when fewer teeth on the speed ring are sensed over the sampling interval improves the accuracy of the wheel speed calculation. As illustrated in FIG. 1B, both leading and trailing edges of the squarewave signals are used in the double edge speed detection method.

When the double edge detection method is used to determine wheel speed, the average time $T_{av}$ between teeth of the wheel speed sensor to be used in equation (1) to determine wheel speed at the end of a sampling interval is determined by the expression $$T_{av} = (T_{(N)} + T_{(N-1)} - T_{(1)} - T_{(0)})/(N-1) \qquad (3)$$

where $T_0$ is the time of occurrence of the next-to-last edge of the squarewave speed signal in the prior sampling interval, $T_{(1)}$ is the time of occurrence of the last edge of the squarewave speed signal in the prior sampling interval, $T_{(N-1)}$ is the time of occurrence of the next-to-last edge of the squarewave speed signal in the present sampling interval, $T_{(N)}$ is the time of occurrence of the last edge of the squarewave speed signals to occur in the present sampling interval and N is one greater than the number of edges (leading and trailing) of the squarewave speed signals occurring during the sampling interval. The time interval from time $T_{(0)}$ to time $T_{(N)}$ comprises the wheel speed calculation interval. Equation (3) eliminates the requirement for symmetry in the squarewave speed signal.

As in the case with the single edge detection method of FIG. 1A, the speed calculation intervals associated with two consecutive sampling intervals overlap so that they do not end and begin on the same edge of a squarewave speed signal thereby minimizing the influence of a single edge of the speed signal on the measurement of wheel speed. Further, all of the wheel speed information available during a sampling interval is utilized in the calculation of the average time between the passing of teeth on the speed ring.

To provide for a transition between single and double edge detection methods as represented in the timing charts of FIG. 1A and FIG. 1B so as to ensure that the same edge of a squarewave speed signal is not used in the measurement of wheel speed in two consecutive calculation intervals, the method and system of this invention redefines the calculation interval for the transition calculation. The edges and their times of occurrence relative to a sampling interval that are utilized for the transition from single to double edge detection when the vehicle speed decreases from above to below the threshold level are illustrated in timing diagram of FIG. 1C. In this case, the time interval within a sampling interval from the time $T_{(0)}$ to the time $T_{(N)}$ comprises the speed calculation interval. The edges and their times of occurrence relative to a sampling interval that are utilized for the transition from double to single edge detection when the vehicle speed decreases from below to above the threshold level are illustrated in timing diagram of FIG. 1D. Again, the time interval within a sampling interval from the time $T_{(0)}$ to the time $T_{(N)}$ comprises the speed calculation interval.

Figure 4:
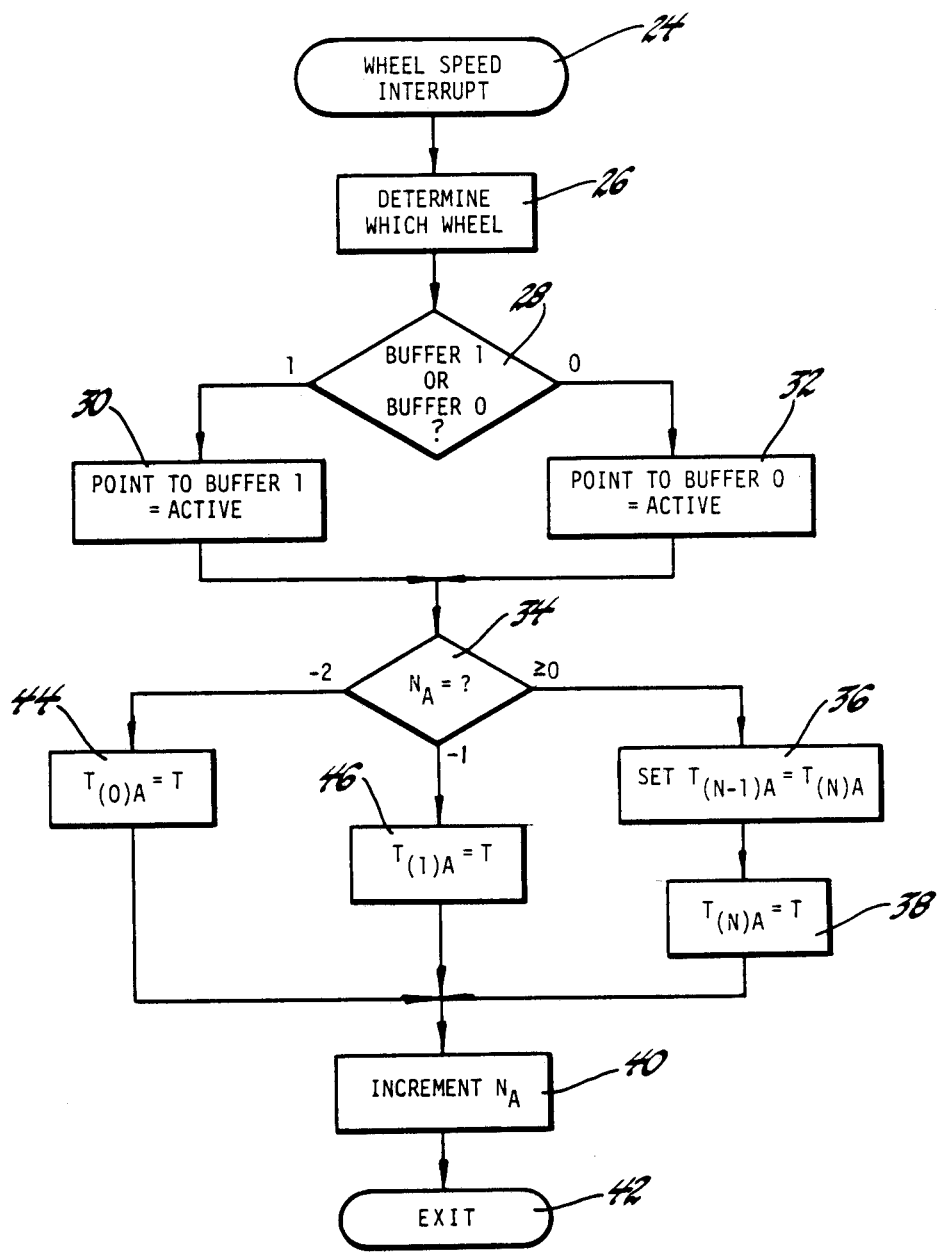
FIGS. 4 and 5 are diagrams illustrating the operation of the brake computer of FIG. 2 in carrying out the speed measurement principles of this invention.
Figure 5:
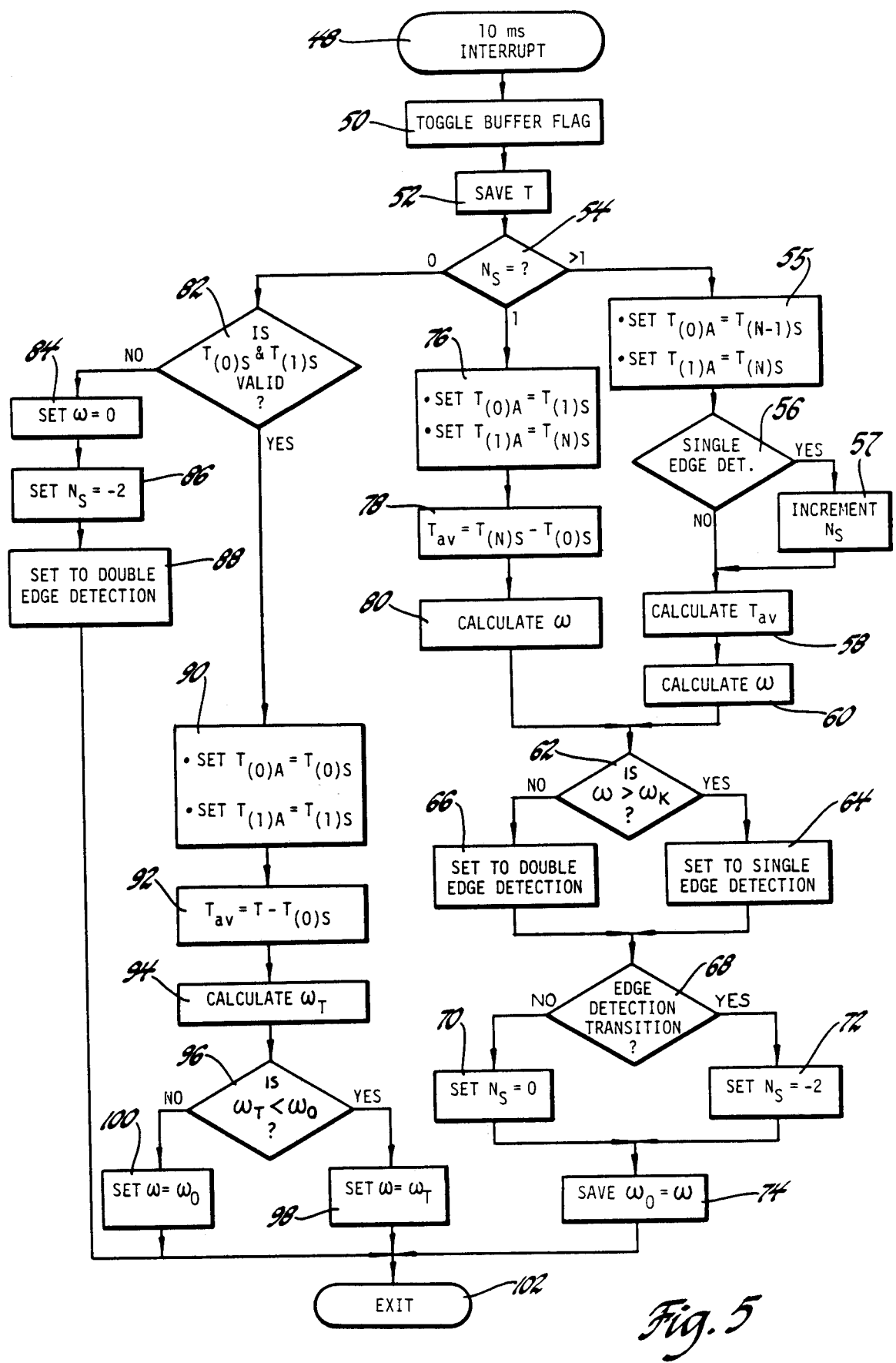

A low speed detection method to be described with respect to FIGS. 4 and 5 is used at very low wheel speeds when an edge of a squarewave speed signal does not occur during the sampling interval.

The speed sensing method and apparatus of this invention are illustrated in conjunction with an anti-lock braking system generally illustrated in FIG. 2. A brake computer 10 is responsive to the speed of the vehicle wheels and, when an incipient wheel lockup condition is sensed, controls the brake pressure to the wheel brakes to prevent wheel lockup. When an incipient wheel lockup condition is sensed based on wheel speed or parameters derived therefrom, the brake computer 10 issues signals to brake pressure control solenoids via solenoid drivers 11 to control the wheel brake pressures to prevent a wheel lockup condition. The front wheel brakes are controlled by the brake computer 10 by control of the pressure release and hold solenoid pairs generally illustrated as 12 and 14 and the rear brakes are controlled together via the brake pressure release and hold solenoid pair generally illustrated as 16. The method of sensing an incipient wheel lockup condition and controlling the wheel brake pressure so as to prevent wheel lockup may be any known method and will not be described in greater detail.

The front and rear wheel speeds of the vehicle are detected by respective wheel speed sensors including speed rings 18a through 18d each being associated with a respective one of the front and rear wheels of the vehicle. Each speed ring has teeth angularly spaced around its circumference. In one embodiment, the teeth are spaced at seven degree intervals. The teeth of the speed rings are sensed by respective electromagnetic sensors 20a through 20d as the speed rings are rotated by the respective wheels. The output of each electromagnetic sensor is a sinusoidal waveform having a frequency directly proportional to wheel speed as represented by the passing of the teeth in proximity to the electromagnetic sensor.

The sinusoidal waveforms from the electromagnetic sensors 20a through 20d are supplied to respective interface and squaring circuits 22a through 22d each of which provides a squarewave output having a frequency directly proportional to the speed of a respective wheel. As is apparent, each squarewave signal has leading and trailing edges corresponding to the leading and trailing edges of a respective tooth of a speed ring.

The brake computer 10 takes the form of a digital computer that is standard in form and includes a central processing unit (CPU) which executes an operating program permanently stored in a read-only memory (ROM) which also stores tables and constants utilized in controlling the wheel brake pressure in response to a detected incipient wheel lockup condition. The computer also includes a random access memory (RAM) into which data may be temporarily stored and from which data may be read at various address locations determined in accord with the program stored in the ROM. The brake computer 10 further includes a clock generating high frequency clock signals for timing and control purposes.

The computer 10 provides a periodic interrupt at predetermined intervals such as at 10 millisecond intervals at which time a program stored in the ROM for calculating the four wheel speeds is executed. This interrupt interval comprises the sampling interval previously referred to with respect to FIG. 1. In addition, the computer responds to each selected edge of the wheel speed squarewave signals and executes a wheel speed interrupt routine stored in the ROM during which the information required to calculate wheel speed is stored.

A timer system is provided in the brake computer that includes a programmable timer comprised of a free running counter clocked either directly by the high frequency clock signals or alternatively via the output of a divider clocked by the clock signals. The brake computer includes an input capture associated with each of the wheel speed signal inputs thereto. Each input capture functions to record the count of the free running counter in a read-only input capture register in response to a program selectable edge of the corresponding squarewave speed signal input from a respective wheel. This count represents the time of occurrence of the respective edge of the squarewave speed signal. The edge of the squarewave speed signal utilized to transfer the count of the counter into the respective input capture register is program selectable to be one or both edges of the input squarewave signal. A computer including the foregoing functions may take the form of the Motorola microcomputer part number MC68HC11A8.

At the higher wheel speeds, large amounts of data must be handled by the brake computer 10 in order to determine the four wheel speeds. To enable the gathering of this large amount of wheel speed data, the brake computer 10 utilizes two identical buffer registers for each wheel. These buffer registers are generally depicted in FIG. 3 as buffer 0 and buffer 1. These buffers are utilized to store the times of occurrence of the various edges of the respective squarewave speed signal as depicted in FIG. 1. These times are obtained from the respective input capture register.

As illustrated in FIG. 3, each of the buffers includes a memory location for storing the times $T_{(0)}$, $T_{(1)}$, $T_{(N-1)}$ and $T_{(N)}$ in addition to a memory location for storing the number of the selected edges of the squarewave wheel speed signal that occur during the sampling interval. While one buffer is active and being used to store new wheel speed data during a sampling interval, the other buffer is static and contains the data from the prior sampling interval which is used to calculate wheel speed.

For example, assuming buffer 0 is the static buffer, buffer 1 is being utilized to continually update the stored time values $T_{(N-1)}$ and $T_{(N)}$ as new edges of the squarewave speed signal are detected in addition to incrementing the count of the selected edges that occur. While this is taking place, the computer 10 utilizes the information in buffer 0 to calculate wheel speed in the manner previously described with respect to FIG. 1. In addition, the times $T_{(N-1)}$ and $T_{(N)}$ in the static buffer are used to preset the times $T_{(0)}$ and $T_{(1)}$ in the active buffer. During the next sampling interval, the buffer 0 becomes the active buffer for gathering wheel speed information and buffer 1 becomes the static buffer from which the wheel speed is calculated.

The 10 millisecond and wheel speed interrupt routines executed by the brake computer 10 for establishing the wheel speeds in accord with this invention are illustrated in FIGS. 4 and 5. FIG. 4 illustrates the wheel speed interrupt routine executed each time a selected edge of the squarewave speed signals occurs. In general, this routine provides for the recording of the various times in the active buffer of FIG. 3 and the number of edges detected to enable calculation of wheel speed. FIG. 5 illustrates the interrupt routine executed at 10 millisecond intervals established such as by the high frequency clock and a counter. This routine generally provides for the calculation of wheel speed. The 10 millisecond interval between consecutive interrupts comprises the sampling interval previously referred to.

Referring first to FIG. 4, the wheel speed interrupt routine is entered at point 24 and proceeds to a step 26 where it determines which wheel speed signal caused the interrupt. This identifies which pair of buffers to use to record wheel speed information. From step 26, the program proceeds to a step 28 where it determines which buffer of the identified pair is the active buffer by sampling the state of a buffer flag that is controlled as will be described with reference to FIG. 5. If buffer 1 is determined to be the active buffer, the program proceeds to a step 30 where a pointer points to buffer 1 as the active buffer. Conversely, if buffer 0 is determined to be the active buffer the program proceeds from step 28 to a step 32 where the pointer points to buffer 0 as the active buffer. Hereinafter, the subscript A refers to information in the active buffer while the subscript S refers to information in the static buffer.

From step 30 or 32, the program proceeds to a step 34 where the program samples the edge count $N_A$ in the active buffer. As will be subsequently explained, this count will be zero or greater except in those situations where a transition between single and double edge detection takes place. Assuming that the edge count $N_A$ is zero or greater, the program proceeds to a step 36 where the time $T_{(N-1)A}$ stored in the active buffer register is set equal to the time $T_{(N)A}$ representing the time of occurrence of the previous detected edge of the squarewave speed signals. Then at step 38, the time $T_{(N)A}$ in the active buffer register is set equal to the time stored in the capture register which is the time of occurrence of the most recent selected edge of the squarewave speed signal.

From step 38, the program proceeds to a step 40 where the count $N_A$ in the active register, representing the number of selected edges of the squarewave speed signals that have occurred during the present sampling interval, is incremented. Following step 40, the program exits the routine at step 42.

As will be described, when the 10 millisecond interrupt routine determines that the conditions exist for a transition between double and single edge detection, the storage location in the active register recording the edge count $N_A$ will be initially preset to a $-2$ for reasons to be described. This condition will be sensed at step 34 after which the program proceeds to a step 44 where the value of the time $T_{(0)A}$ in the active buffer is set equal to the time stored in the capture register. Following this step, the time $T_{(0)A}$ stored in the active buffer is the time of occurrence of the first selected edge of the squarewave speed signal during the current sampling interval. This time is illustrated in FIGS. 1C and 1D for both single and double edge detection. During the next wheel speed interrupt in response to the occurrence of the next selected edge of the squarewave speed signal, the program proceeds from step 34 to a step 46 where the value of the time $T_{(1)A}$ in the active buffer is set equal to the time stored in the capture register. Following this step, the time $T_{(1)A}$ stored in the active buffer is the time of occurrence of the second selected edge of the squarewave speed signal during the current sampling interval. This time is illustrated in FIGS. 1C and 1D depending upon whether the single or double edge detection method has been selected.

In the foregoing manner, when a transition between single edge and double edge detection is required, the values of $T_{(0)A}$ and $T_{(1)A}$ in the active register are preset to the times of occurrence of the proper edges of the squarewave speed signals.

Referring to FIG. 5, the 10 millisecond interrupt routine is illustrated. This routine is entered at point 48 and proceeds to a step 50 where the buffer flag is toggled to interchange the active/static condition of the buffers 0 and 1 of FIG. 3. At the next step 52, the count in the free running counter representing current time is saved for low speed estimation as will be described. This time represents the time of occurrence of the 10 millisecond interrupt.

The remaining steps of FIG. 5 are executed once for each wheel. However, the routine is only demonstrated for a single wheel, it being understood that it is repeated in similar fashion for the remaining three vehicle wheels to determine their individual speeds.

At step 54, the program samples the number $N_{(S)}$ stored in the static buffer. It will be recalled, that this buffer contains the most recent information concerning wheel speed gathered during the just completed sampling interval. If $N_{(S)}$ is greater than 1 as will occur for all wheel speed conditions except for the very lowest wheel speed conditions, the program proceeds to a step 55 where the storage location in the active buffer storing the value $T_{(0)A}$ is preset to the time $T_{(N-1)S}$ of the static buffer. With reference to FIGS. 1A and 1B, this establishes the time of $T_{(0)}$ of the calculation interval. Similarly, the time $T_{(1)A}$ of the active register is preset to the time $T_{(N)S}$ in the static buffer. Again with reference to FIGS. 1A and 1B, this establishes the times $T_{(1)}$ of the calculation interval.

From step 55, the program proceeds to a step 56 where it determines if the single or double edge detection method is being used to determine wheel speed. If the single edge detection method is being used, the program proceeds to a step 57 where the value of $N_{(S)}$ in the static buffer is incremented so that its value properly reflects the number of speed ring teeth within the calculation interval to be used in the calculation of wheel speed according to equation (2).

From step 56 or 57, the program proceeds to a step 58 where the average time between teeth on the speed ring is determined in accord with equation (2) if the single edge detection method is being used or equation (3) if the double edge detection method is being used. Both equations use the wheel speed information in the static register representing the wheel speed information gathered during the most recent sampling interval. As previously described, the calculation interval beginning with the time $T_{(0)}$ in the static buffer overlaps the previous calculation interval so that they do not end and begin on the same edge of the squarewave speed signals. From step 58, the program proceeds to a step 60 where wheel speed is calculated based on equation (1).

From step 60, the program determines whether or not a transition between single and double edge detection methods is required. This is accomplished beginning at step 62 where the wheel speed calculated at step 60 is compared with a threshold value above which single edge detection is required and below which double edge detection is required. If the wheel speed is greater than the threshold value, the program proceeds to a step 64 where the program is conditioned for single edge detection wherein the input capture functions and the wheel speed interrupt are conditioned to respond only to alternating edges of the squarewave speed signals. Conversely, if the wheel speed is equal to or less than the threshold value, the program proceeds from step 62 to a step 66 where the program is conditioned for double edge detection wherein the input capture functions and the wheel speed interrupt are conditioned to respond to all edges of the squarewave speed signals.

From step 64 or step 66, the program proceeds to a step 68 where it determines whether or not a transition has been made between single and double edge detection. If not, the value of $N_{(S)}$ in the static buffer is preset to zero. However, if the program determines that a transition between single and double edge detection has resulted from step 64 or step 66, the program proceeds to a step 72 where the value of $N_{(S)}$ in the static register is set to a $-2$. In reference to steps 44 and 46 in the wheel speed interrupt routine of FIG. 4, this step conditions the wheel speed interrupt routine to execute the steps 44 and 46 previously described.

From step 70 or step 72, the program then proceeds to a step 74 where a register in the RAM storing an old value of wheel speed is preset to the last measured value of wheel speed. As will be described, this value of wheel speed will be utilized during the low speed estimation routine to be described.

Returning to step 54, if the value of $N_{(S)}$ in the static register is equal to 1, indicating that only one edge of the squarewave speed signals has been detected during the prior interrupt interval (a condition that will occur only at low wheel speeds where the double edge detection method has been selected by steps 62 and 64), the program proceeds to a step 76 where the time $T_{(0)A}$ in the active register is set equal to the value of $T_{(1)S}$ of the static register. Similarly, the time $T_{(1)A}$ of the active register is preset to the time $T_{(N)S}$ of the static register. Step 76 is required when only a single edge of the squarewave wheel speed signal is detected during a sampling interval since the last two edges correspond to the times $T_{(1)S}$ and $T_{(N)S}$ of the static register.

From step 76, the program proceeds to a step 78 where the average time $T_{av}$ between teeth on the speed ring is determined by subtracting the time $T_{(0)S}$ from the time $T_{(N)S}$. From step 78, the program proceeds to a step 80 where the wheel speed is calculated based on equation (1) using the value of $T_{av}$ determined at step 78. From step 80, the program executes the steps 62 thru 64 to determine whether or not a transition is required between single and double edge detection as previously described.

At very low wheel speeds, the possibility exists that no edge of the wheel speed signals will be detected during a sampling interval between 10 millisecond interrupts. Even though no wheel speed signals are received, there is still information upon which an estimation of wheel speed may be determined. In general, when the condition exists that no edges are detected during an interrupt interval, the controller assumes that an edge was detected just at the end of the sampling interval. Thereafter, the controller calculates a maximum possible wheel speed based on the supposed detection of a wheel speed signal at the end of the sampling interval. This maximum value is compared with the speed calculated at the end of the prior sampling interval. The minimum of the two wheel speed values is then used as an estimation of the current wheel speed. Thereafter, when an actual edge is detected in the next or subsequent sampling interval, a true period measurement is made and wheel speed is calculated in accord with the steps 76 through 80 as previously described or steps 56 through 60 depending upon the number of edges detected.

Assuming no edges of the squarewave speed signal were detected during the sampling interval just completed, the program proceeds from step 54 to a step 82 where it determines whether or not the initial times $T_{(0)S}$ and $T_{(1)S}$ representing the time of the last two detected edges are valid. This step is required to accommodate the condition wherein the vehicle stops and long periods of time elapse without the detection of a new edge of the wheel speed signal. If the time lapse is too great indicating the stored times are no longer valid, the program proceeds to a step 84 where the wheel speed is set to zero and thereafter to step 86 where the value of $N_S$ in the static register is preset to $-2$. At step 88, the program conditions the brake computer for double edge detection.

Returning to step 82, if the times $T_{(0)S}$ and $T_{(1)S}$ are determined to be valid, the program proceeds to a step 90 where the value of the time $T_{(0)A}$ in the active buffer is preset to the time $T_{(0)S}$ in the static register. Similarly, the time $T_{(1)A}$ is preset to the time $T_{(1)S}$. This step provides for the intialization of the active register to the times of the last two detected edges of the squarewave signals. Thereafter, at step 92, the average speed between teeth is assumed to be the difference between the current time stored at step 52 and the time $T_{(0)S}$ stored in the static register. Based on this time, the program calculates a temporary wheel speed signal at step 94 in accord with equation (1). At step 96, this temporary wheel speed is compared with the last detected actual wheel speed saved at step 74. If the temporary wheel speed is less than the last actual measured wheel speed, the program proceeds to a step 98 where the actual wheel speed is set to the temporary wheel speed. However, if the temporary wheel speed calculated at step 94 is greater than the last actual wheel speed calculated and saved at step 74, the program proceeds to a step 100 where the actual wheel speed is set to the last actual wheel speed determined and saved at step 74. Steps 96 thru 100 functions to set the actual wheel speed, when no new wheel speed edges are detected, to the lower of (1) the wheel speed based on the assumption of a wheel speed pulse occurring at the end of the sampling interval or (2) the last calculated wheel speed value. From step 74, 88, 98 or 100, the program exits the routine at step 102.

In summary, the calculation periods based on consecutive sampling intervals overlap such that the end point of one calculation interval does not comprise the beginning point of the next calculation interval. This minimizes the influence of a single wheel speed signal on the calculation of wheel speed so as to minimize the errors that may be associated with the angular position of a single wheel speed signal. The foregoing is accomplished while yet utilizing wheel speed information over a complete sampling interval so as to maximize the accuracy of the wheel speed measurement.

The foregoing description of a preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A system for measuring the speed of a rotating member, the system comprising, in combination:

means for generating a speed signal for each predetermined angular rotation of the member, the generated speed signals having a frequency directly proportional to the rotational speed of the member;

means for counting the number of speed signals generated during each of successive sampling intervals; and means effective at the end of each sampling interval for (A) determining the elapsed time from the next-to-last speed signal generated in the prior sampling interval to the last speed signal generated, the elapsed time comprising a calculation interval and (B) dividing the calculation interval by one greater than the number of speed signals counted during the sampling interval to obtain the average time between speed signals, the average time being a measure of the speed of the rotating member, whereby successive calculation intervals overlap so as to minimize the influence of one speed signal on successive determinations of the speed of the rotating member.

2. A system for measuring the speed of a rotating member, the system comprising, in combination:

a speed ring rotated by the rotating member and having teeth spaced around the periphery thereof;

a sensor for sensing the passing of the teeth on the speed ring as the speed ring is rotated and generating a squarewave signal for each tooth sensed, the squarewave signals generated having a frequency directly proportional to the rotational speed of the member;

means for counting alternating edges of the generated squarewave signals during each of successive sampling intervals when the counter is in a single edge mode and for counting all the edges of the generated squarewave signal during each of successive sampling intervals when the counter is in a double edge mode;

means effective at the end of each sampling interval for (A) determining the average time $T_{av}$ between each sensed tooth on the speed ring in accord with the expression $$T_{av} = (T_{(N)} - T_{(0)})/(N)$$

when the counter is in a single edge mode where $T_{(N)}$ is the time of occurrence of the last edge counted, T(0) is the time of occurrence of the next-to-last edge counted in the prior sampling interval and N is one greater than the edges counted during the sampling interval and (B) determining the average time $T_{av}$ between each sensed tooth on the speed ring in accord with the expression $$T_{av} = (T_{(N)} + T_{(N-1)} - T_{(0)} - T_{(1)})/(N-1)$$

when the counter is in a double edge mode where $T_{(N-1)}$ is the next-to-last edge counted during the sampling interval and $T_{(1)}$ is the next-to-last edge counted during the prior sampling interval, the average time $T_{av}$ being a measure of the speed of the rotating member.

3. The system of claim 2 further including means to determine the speed of the rotating member in accord with the expression $$\omega = k/T_{av}$$

where k is a constant.

4. The system of claim 3 further including means to set the counter in the single edge mode when the last determined speed of the rotating member is greater than a predetermined value and in the double edge mode when the last determined speed of the rotating member is less than the predetermined value.

5. A system for measuring the speed of a rotating member, the system comprising, in combination:

means for generating a speed signal for each predetermined angular rotation of the member, the generated speed signals having a frequency directly proportional to the rotational speed of the member;

means for generating interrupt signals at predetermined time intervals, each interval comprising a sampling interval;

first and second memory means each having memory locations for storing the times $T_{(N)}$ and $T_{(N-1)}$ corresponding to the times of occurrence of the last and next-to-last speed signals generated during the present sampling interval and for storing the time $T_{(0)}$ corresponding to the time of occurrence of the next-to-last speed signal generated during the prior sampling interval, one of the memory means being designated an active memory and the other one of the memory means being designated a static memory;

means for updating the stored times $T_{(N)}$ and $T_{(N-1)}$ in the active memory upon the generation of each speed signal;

means for counting the number of speed signals generated during each sampling interval;

means responsive to the generation of an interrupt signal ending a sampling interval to (A) interchange the active and static designations of the first and second memory means, (B) update the time $T_{(0)}$ in the newly designated active register to the time $T_{(N-1)}$ stored in the newly designated static register and (C) determine the average time $T_{av}$ between speed signals in accord with the expression $$T_{av} = (T_{(N)} - T_{(0)})/N$$

wherein the times $T_{(N)}$ and $T_{(0)}$ are obtained from the newly designated static register and N is one greater than the number of speed signals counted during the prior sampling interval, the average time $T_{av}$ being a measure of the speed of the rotating member, whereby successive calculations of the average time $T_{av}$ are based on overlapping time intervals so as to minimize the influence of one speed signal on successive determinations of the speed of the rotating member.

6. The method of measuring the speed of a wheel, the method comprising the steps of:

generating a speed signal for each predetermined angular rotation of the wheel, the generated speed signal having a frequency directly proportional to the rotational speed of the member;

counting the number of speed signals generated during each of successive sampling intervals; and at the end of each sampling interval (A) determining the elapsed time from the next-to-last speed signal generated in the prior sampling interval to the last speed signal generated, the elapsed time comprising a calculation interval and (B) dividing the calculation interval by one greater than the number of speed signals counted during the sampling interval to obtain the average time between speed signals, the average time being a measure of the speed of the rotating member, whereby successive calculation intervals overlap so as to minimize the influence of one speed signal on successive determinations of the speed of the rotating member.

* * * * *